United States Patent [19]

Werner

[11] Patent Number: 4,552,079
[45] Date of Patent: Nov. 12, 1985

[54] MACHINE FOR PLANTING SEEDS
[75] Inventor: Anton Werner, Saverne, France
[73] Assignee: Kuhn S.A., Saverne, France
[21] Appl. No.: 562,028
[22] Filed: Dec. 15, 1983

Related U.S. Application Data

[63] Continuation of Ser. No. 410,863, Aug. 23, 1982, abandoned, which is a continuation-in-part of Ser. No. 125,217, Feb. 27, 1980, abandoned.

[51] Int. Cl.⁴ .............................................. A01C 5/00
[52] U.S. Cl. .................................... 111/85; 172/49.5; 172/52; 172/63; 172/71
[58] Field of Search ............................... 111/1, 8–14, 111/52, , 85; 172/28, 68, 47, 52, 71, 112, 63, 123, 29, 45, 49–51, 125, 32, 44, 65, 72; 47/1.42

[56] References Cited

U.S. PATENT DOCUMENTS

| | | | |
|---|---|---|---|
| 354,513 | 12/1886 | Lubin | 111/11 |
| 971,990 | 10/1910 | Grantham | 111/13 |
| 1,239,599 | 9/1917 | Hicks | 111/10 |
| 1,319,936 | 10/1919 | Wentworth | 172/68 |
| 1,909,211 | 5/1933 | Monroe | 111/10 |
| 2,524,871 | 10/1950 | Andrus | 111/1 |
| 2,915,995 | 12/1959 | Shelby | 111/10 |
| 3,106,793 | 10/1963 | Savage | 172/32 |
| 3,316,865 | 5/1967 | Williams | 111/6 |
| 3,563,191 | 2/1971 | Yovanovich | 111/10 |
| 3,828,859 | 8/1974 | Alvarez | 172/50 |
| 3,905,313 | 9/1975 | Grether | 111/10 X |
| 4,049,061 | 9/1977 | Van Der Lely | 111/13 X |
| 4,324,295 | 4/1982 | Weichel | 111/1 X |

FOREIGN PATENT DOCUMENTS

| | | | |
|---|---|---|---|
| 22875 | 3/1918 | Denmark | 172/67 |
| 70444 | 12/1949 | Denmark | 110/10 |
| 70444 | 1/1950 | Denmark | 111/10 |
| 401879 | 9/1924 | Fed. Rep. of Germany | 172/68 |
| 2301374 | 1/1973 | Fed. Rep. of Germany | 111/1 |
| 2506223 | 8/1976 | Fed. Rep. of Germany | 172/28 |
| 1452690 | 9/1966 | France | 111/10 |
| 2204101 | 5/1974 | France | 111/1 |
| 492 | of 1907 | United Kingdom | 172/52 |
| 1314829 | 4/1973 | United Kingdom | 111/10 |
| 1335268 | 10/1973 | United Kingdom | 111/10 |
| 378152 | 6/1973 | U.S.S.R. | 111/10 |
| 485714 | 1/1976 | U.S.S.R. | 172/67 |

Primary Examiner—James R. Feyrer
Attorney, Agent, or Firm—Mamorek, Guttman & Rubenstein

[57] ABSTRACT

A machine for planting seeds includes a rotary soil lifting device which lifts broken-up soil, a tamping roller which tamps the remaining broken-up soil, an arrangement for placing seeds onto the upper surface of the tamped layer of the ground, and an arrangement for conveying the soil lifted by the soil lifting device past and upwardly of the tamping roller and for depositing this soil onto the tamped surface and onto the seeds placed thereon as a layer of uniform thickness. A compacting roller may be used to compact the soil of this layer after the formation of the latter, and the machine includes breaking-up tools of the fixed or rotating type mounted at the front region of the machine for breaking up the soil prior to and to a depth sufficient for the performance of the lifting operation by the soil lifting device. The conveying arrangement may include two hoods which together define a passage through which the lifted soil advances upwardly of and beyond the tamping roller. The discharge ends of tubes which constitute parts of the seed placing arrangement may be moved closer to the tamping roller to allow the seeds to spread out in random fashion, or closer to the area at which the lifted soil descends onto the ground to achieve planting in rows.

8 Claims, 2 Drawing Figures

MACHINE FOR PLANTING SEEDS

This is a continuation of application Ser. No. 410,863, filed Aug. 23, 1982, now abandoned, which is a continuation of application Ser. No. 125,217, filed Feb. 27, 1980, now abandoned.

BACKGROUND OF THE INVENTION

The present invention relates to a method of and a machine for planting seeds in general and more particularly to a machine of this type which is also capable of breaking up the soil prior to the actual planting operation.

There are already known various machines of the type here under consideration which are capable of both breaking up the soil and planting seeds therein. Such conventional machines are either towed behind a tractor or self-propelled to move over the field to be tilled, include at their front portion either stationary tools, such as plowing blades or cultivator tines, or movable tools such as disks rotating about a horizontal axis or prongs or similar tools orbiting around vertical axes. Immediately behind these breaking-up tools, there are provided arrangements which cause the seeds to be planted to become deposited on, or penetrate into the ground. Such arrangements, which usually are constructed as tubes, more often than not, discharge the seeds at a zone where the soil broken up by the breaking-up tool descends onto the ground. It is also known to equip the conventional machines of this type with a compacting roller which serves the dual purpose of compacting the upper layer of the soil at the region of deposition of the seeds, and of controlling the working depth of the breaking-up tools.

Experience with these conventional machines has shown that they are disadvantageous in several respects. One of the serious drawbacks of these conventional machines is that the seeds are not deposited in or on the ground under conditions which would be most conducive to their subsequent growth. As a matter of fact, the depth below the surface at which the seeds planted by the conventional machine are located varies within relatively wide limits. This is due partly to the fact that the seeds already deposited on or travelling toward the ground are entrained by the soil travelling rearwardly from the breaking-up tools for joint travel therewith in the rearward direction, and partly to the fact that the seeds become deposited on soil which has been previously broken up or loosened but which has not been tamped or compacted prior to the deposition of the seeds thereon. As a result of the latter situation, the seeds can fall into cracks or other gaps in the ground, such as gaps present between adjacent soil granules or aggregates. It is well known that a seed which is situated more than 10–15 cms. below the upper surface of the ground after the planting does not germinate. In addition thereto, if the upper layer of the soil is too loose, moisture from the subsoil is hindered in rising toward the seeds due to capillary action so that the seeds may be deprived of the moisture needed for their growth. On the other hand, if the upper layer of the soil is too loose, the latter dries out very rapidly after being moistened by rain or other precipitation, which also impedes the growth of the plants from the seeds.

SUMMARY OF THE INVENTION

Accordingly, it is one of the principal objects of the present invention to avoid the disadvantages of the prior art.

More particularly, it is an object of the present invention to develop a machine which performs a method of planting seeds which is not possessed of the disadvantages of the conventional seed-planting methods.

A further object of the present invention is to provide a seed-planting machine which performs a method which renders it possible to plant the seeds under optimum conditions for their subsequent growth.

A concomitant object of the present invention is to develop a machine which is simple in construction, inexpensive to manufacture, easy to use, and reliable in operation.

Other objects of the invention will in part be obvious and in part appear hereinafter.

With the above and other objects of the invention in view, one feature of the present invention resides in a machine which performs a method of planting seeds into the ground, which comprises the steps of breaking up the ground, moving and lifting a top layer of soil off the thus broken ground, so that a lower layer of the ground is uncovered, providing a tamping of the uncovered lower layer free of any of the top layer immediately previously removed from the soil during said moving and lifting step, placing seeds onto the uncovered and tamped lower layer, depositing the lifted soil of the top layer in the form of a loose-consistency covering layer onto the uncovered and tamped lower layer and onto the seeds placed thereon for covering the latter, and compacting the deposited covering layer.

A particular advantage of this method is that the quantity of soil which has been lifted off the ground is returned to the lower layer of the ground, only after the same has been tamped and the seeds deposited thereon, as a layer of uniform thickness. Thus, all seeds are located at the same depth below the final surface since their deposition on the already tamped ground prevented them from descending to lower depths into cracks or the like, and the layer of soil deposited on top of the seeds is uniform throughout.

The machine of the present invention which is capable of performing the above method is movable in a forward direction over a ground, and comprises break-up means positioned forwardly for breaking up the ground, soil conveyance means including a soil lifting device disposed rearwardly of said break-up means operative for moving and lifting a top layer of soil off the thus broken ground, so that a lower layer of the ground is uncovered, said soil lifting device comprises a plurality of tools rotatable about an axis transverse to said forward direction, tamping means located rearwardly of said soil lifting device and including a tamping roller rotatable about an axis transverse to said forward direction said tamping roller being adapted for providing a tamping of the uncovered lower layer free of any of the top layer immediately previously removed from the soil by said soil conveyance means, seed emplacement means for placing seeds on the tamped lower layer, said soil conveyance means conveying the lifted soil upwardly and so as to deposit it on the ground to the rear of said seed emplacement means, and compacting means rearwardly of said tamping means, for compacting the deposited covering layer, whereby the lifted soil is deposited in the form of a loose-consistency covering layer onto the tamped layer, and onto the seed placed on the tamped surface.

When the machine is constructed in the above-discussed manner, there are obtained several important advantages. One of the more important advantages is that the seeds are covered by a layer of soil having a substantially uniform thickness after the seeds have been placed on a substantially level surface which has been tamped by the action of the tamping roller. Another advantage obtained when the machine of the present invention is employed is that it is possible to cover the seeds with a layer of soil which has a predetermined, preferably relative fine, granularity. Additionally, it is possible, when using the present invention, to avoid mixing of the seeds with the soil intended for covering such seeds, in that the seeds are placed on the tamped ground ahead of the location at which the soil previously lifted off the ground descends onto the ground.

The fact that the layer of soil onto which the seeds are placed is tamped prior to the placing of the seeds brings about the double advantage of reducing excessive drying of the subsoil even during a period of drought and of permitting the moisture contained in the subsoil to rise to the seeds due to capillary forces. As a result of the employment of the machine of the present invention, there is obtained a situation where the seeds are situated at a depth at which, on the one hand, they can be reached by the moisture rising through the subsoil due to capillary forces and needed for their germination and growth and, on the other hand, they are accessible to the heat and air passing through the layer of soil covering the same, so that all conditions needed for germination of such seeds and growth of the plants therefrom are met.

Another advantage of the machine according to the present invention, is that it is possible to vary the types of seedlings, or to adjust the machine to different types of seeds, in dependence on the distance at which the seeds are placed behind the tamping roller. If the seeds are placed immediately behind the tamping roller on the leveled and tamped surface, sufficient time is available for the seeds to spread out before they are covered by the layer of previously lifted soil and an effect is obtained as if the seeds were distributed at random even though, in fact, the seeds are placed on the tamped surface in a row.

In contrast thereto, when the seeds are delivered to a zone which is more spaced from the tamping roller and closer to the zone at which the previously lifted soil descends onto the tamped surface, the seeds do not have sufficient time available to them to become scattered over the tamped surface. As a result of this, the seeds will remain in the original rows as placed on the tamped surface, or substantially so, at the time at which they are covered by the descending previously lifted soil, so that the end effect is planting of the seeds in rows.

The invention accordingly comprises the features of construction, combination of elements and arrangement of parts, as well as the several steps and the relation of one or more of such steps with respect to each of the others, which will be exemplified in a construction and the detailed disclosure hereinafter set forth and the scope of the application of which will be indicated in the claims.

DESCRIPTION OF THE PREFERRED EMBODIMENTS

Figure 1:
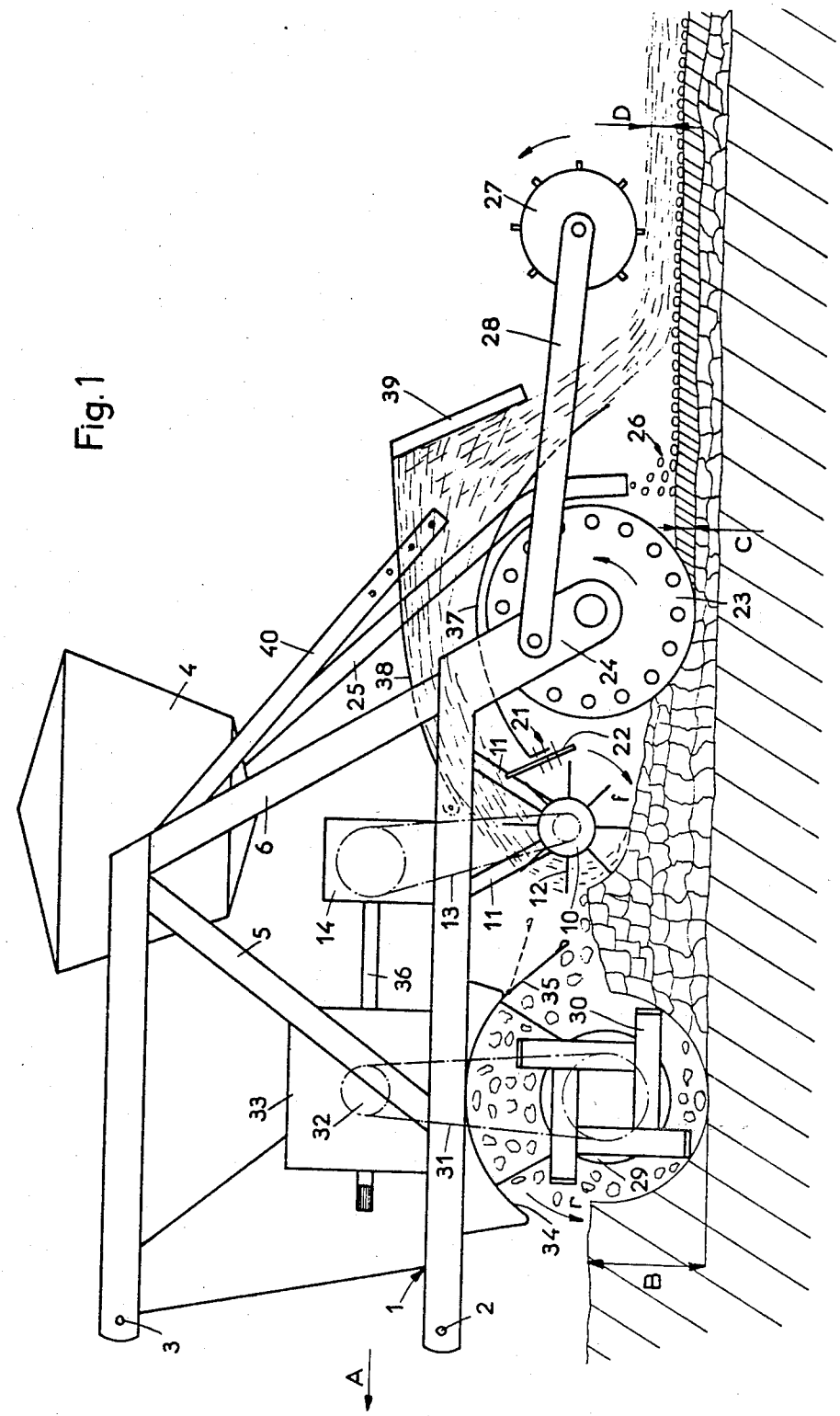
FIG. 1 is a somewhat diagrammatic side elevational view of a first embodiment of the machine according to the present invention.

Referring now to the drawings in detail, and first to FIG. 1 thereof, it may be seen that the machine according to the invention includes a frame 1. The frame 1 is provided, at its front end, with brackets 2 and 3 or similar mounting elements by means of which the machine can be attached to a tractor (which is not shown in the drawings) or a similar apparatus for advancing the machine in the direction of an arrow A. A bin or hopper 4 which accommodates a supply of seeds (such as grain) is mounted on the frame 1 by means of supports 5 and 6, at an elevated position.

A rotating soil breaking-up cutter 29, having blades 30 which orbit about an axis of the cutter 29 in a direction of an arrow r is capable of penetrating into the ground to a depth B of about 25–30/cms., and is mounted at the front portion of the frame 1. This cutter 29 is capable of breaking up or otherwise disintegrating the topsoil to the depth B. This breaking up cutter 29 which is mounted on the frame 1 of the machine is driven in rotation by means of a chain transmission 31 trained about a sprocket wheel 32 of a crankcase 33 which is directly connected to the implement powering output of the tractor which pulls the machine of the present invention in the direction indicated by the arrow A. The breaking-up cutter 29, the axis of rotation of which extends substantially horizontally and at a right angle to the direction A of movement of the machine, is covered by a hood 34 having a rear portion 35 which is pivotably mounted on the remainder of the hood 34. This rear portion 35 slightly levels the terrain broken up by the blades 30 of the breaking-up cutter 29. The blades 30 are advantageously arranged in a helix around the axis of rotation of the breaking-up cutter 29.

A lifting cutter 10 of a smaller diameter than the breaking-up cutter 29 is mounted on the frame 1 rearwardly of the breaking-up cutter 29 for rotation about an axis extending below the frame 1 and substantially horizontally and at a right angle to the direction A of forward movement of the machine. This lifting cutter 10 is fastened to the frame 1 by means of braces 11 and 10 is provided with lifting tools, such as blades 12, capable of lifting a predetermined quantity of the soil which has been previously broken up by the breaking-up cutter 29. Blades 12 are rotatable about an axis transverse to the forward direction A. The lifting tools provided on lifting cutter 10 may be in the form of blades, as illustrated, or may be in such other forms as are known to those skilled in the art for lifting soil, for example, teeth, prongs, spades, etc. The axis of rotation of the lifting cutter 10 and the dimensions of the latter are so selected that the free ends of the blades 12 penetrate below the surface of the ground which has been broken up by the breaking-up cutter 29, to a depth of about 5–10 cms.

In addition to lifting the soil, the blades 12 also serve for crushing the soil which they lift. To achieve this, the lifting cutter 10 is rotated in a direction indicated by an arrow f at an elevated rotational speed, being driven in rotation by a chain transmission 13, to give an example.

The chain transmission 13 is set in motion by means of a crank case 14 which is mounted on the frame 1 and which is connected to the crank case 33 by a shaft 36.

The soil lifted by the lifting cutter 10 and travelling upwardly of its axis of rotation is thrown rearwardly between two hoods 37 and 38 which extend one above the other.

A soil amount controlling device 21 is provided in front of the lower hood 37 and serves for controlling the amount of soil lifted by the blades 12 of the lifting cutter 10 which is permitted to penetrate between the two hoods 37 and 38. This controlling device 21 is constituted by a plate 22 extending transversely of the machine over the entire width thereof and perpendicularly to the layer of soil lifted by the lifting cutter 10. The position of this plate 22 may be adjusted so that the amount of soil thrown rearwardly by the lifting cutter 10, may be adjusted. To achieve this, the adjustable plate 22 can be displaced closer to or farther away from the upper hood 38 in order to reduce or increase the aperture through which the soil thrown rearwardly by the blades 12 of the lifting cutter 10 can enter the space between the hoods 37 and 38.

A tamping roller 23 which, as illustrated, includes two end disks and a plurality of transverse bars extending between the end disks, is mounted below the hood 37. This tamping roller 23 extends perpendicularly to the direction A of advancement of the machine and parallel to the axis of rotation of the lifting cutter 10, and is fastened to the frame 1 of the machine by means of arms 24 located at the two ends of the tamping roller 23. Inasmuch as the tamping roller 23 is located forwardly of the discharge zone of the layer of soil thrown rearwardly by the lifting cutter 10, it is capable of tamping the soil which has previously been broken up by the breaking-up cutter 29, ahead of the zone at which the soil lifted by the lifting cutter 10 descends on the tamped ground.

The bin 4 communicates with tubes 25 which pass through the hoods 38 and 37 and have their discharge ends located immediately rearwardly of the tamping roller 23. These tubes 25 convey seeds 26 originally contained in the bin 4 toward the tamped surface of the ground. The seeds 26 may be distributed among the various tubes 25 by a conventional distributing device which has not been illustrated in the drawings and which is energized, for instance, by the tamping roller 23. As sufficient amount of time is available to the seeds 26 to become uniformly distributed over the tamped ground when the discharge ends of the tubes 25 are placed quite closely behind the tamping roller 23, the effect is reminiscent of planting the seeds 26 at random.

According to an important aspect of the present invention, the seeds 26 are placed onto a layer of a thickness C which has been previously tamped by the tamping roller 23, before being covered by the soil which has been previously lifted by the lifting cutter 10 and thrown rearwardly by said lifting cutter 10. As a result of the presence of the controlling or calibrating device 21 arranged immediately rearwardly of the lifting cutter 10, it is possible to precisely control the quantity of soil which will cover the seeds 26, which renders it possible to cover such seeds 26 with a layer of soil having a thickness D which is as uniform as possible. The thickness D of this covering layer is so chosen that the best possible conditions of growth of plants from the seeds 26 are obtained.

In addition thereto, the fact that the seeds 26 are placed onto the ground previously tamped by the tamping roller 23 between the latter and the area of descent of the previously lifted soil onto the ground and onto the seeds 26 with the purpose of covering the latter, renders it possible to avoid mixing of the seeds 26 with the descending soil. This guarantees that each seed 26 is located at always the same depth below the surface of the ground, at a location where it is acccessible to the moisture rising from the subsoil and to the heat from sun or the ambient atmosphere penetrating through the layer covering the seeds 26.

As also shown in FIG. 1 the machine of the present invention may be equipped with a compacting roller 27 which rolls on the ground owing to the forward movement of the machine and which is mounted on the arms 24 supporting the tamping roller 23 by means of additional arms 28. The purpose of this compacting roller 27 is to slightly compact the soil layer which covers the seeds 26 so as to improve the conditions for growth of the latter.

A deflector 39 enclosing a predetermined angle with the hood 38 is provided at the rear portion of the hood 38. The function of this deflector 39 is to deflect the soil advancing between the hoods 37 and 38 onto the ground and to simultaneously crush the soil particles or granules. The angle of inclination of the deflector 39 relative to the hood 38 is advantageously adjustable, independently of adjustment of the position of the hood 38 which is fastened to the frame 1 of the machine by means of braces 40, the lower ends of which are provided with means for fastening the hood 38 in respective lowered or raised positions.

Figure 2:
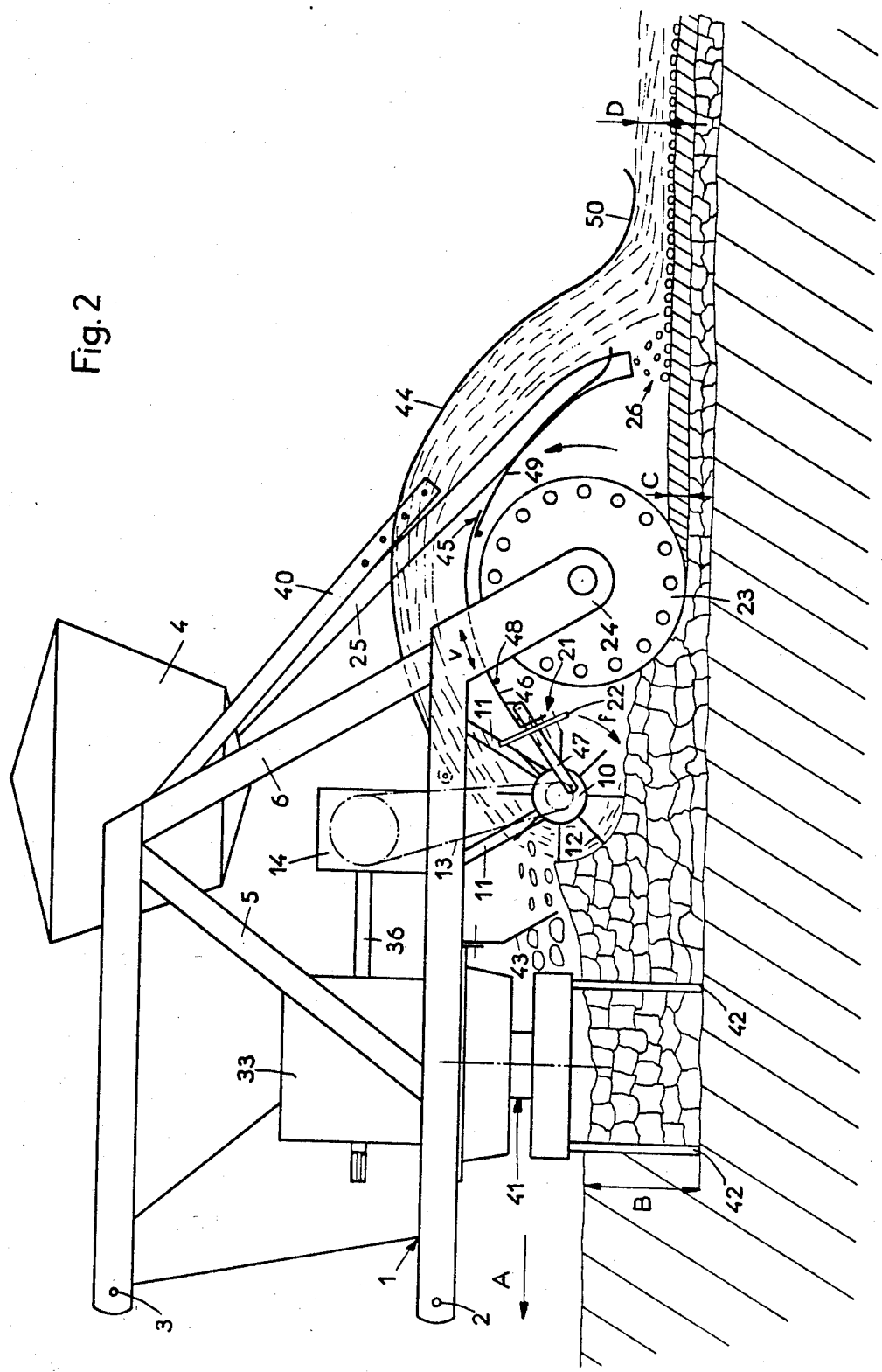
FIG. 2 is a view similar to FIG. 1 but of a modified embodiment of the present invention.

FIG. 2 illustrates an embodiment of the machine according to the present invention which is similar to that discussed with reference to FIG. 1 in so many respects that only those parts appearing for the first time in FIG. 2 will be discussed in some detail, while the common parts will be identified by the same reference numerals.

As illustrated in FIG. 2, the modified machine according to the invention comprises a rotatable harrow 41 provided with teeth 42 and mounted at the forward region of the machine. Each harrow 41 has two of the teeth 42 which orbit about the respective vertical axis of the harrow 41. The axes of rotation of the harrows 41 are substantially aligned perpendicularly to the forward direction A of the machine. The rotatable harrow 41 is mounted on the frame 1 and is set in rotary motion by a transmission which has been omitted from the drawing in order not to unduly encumber the same, the transmission being energized from a crankcase 33 which is directly connected to the implement-energizing output shaft of the tractor. As the teeth 42 revolve about the axis of the harrow 41, they crush the soil and throw the same in the rearward direction of the machine. A grating 43 is located rearwardly of the harrow 41 and lets fine soil granules pass therethrough while retaining huge soil granules or agglomerations and stones in front thereof. This avoids the possibility that blades 12 of the lifting cutter 10 could lift such agglomerations or stones and throw the same rearwardly of the machine.

The lifting cutter 10 resembles the one described in connection with FIG. 1 and functions in the same manner and for the same purpose so that it need not be discussed in detail herein. However, it is to be mentioned that the blades 12 of the lifting cutter 10 lift the soil from rearwardly of the grating 43 and advance such soil upwardly of the axis of rotation of the cutter 10 and into the space between two hoods 44 and 45. The hood 44 is similar to that discussed above in connection with FIG. 1 and indicated at 38. This hood 44 is held in place by braces 40 which are equipped with means for holding the hood 44 at different distances from the hood 45. In order to avoid possible clogging of the space between the hoods 44 and 45 by the soil, a forward portion 46 of the hood 45, which carries the controlling or measuring device 21, is set in forward and rearward motion by a reciprocatory mechanism, as indicated by an arrow v. This forward and rearward motion is caused by a connecting rod 47 which is pivotally connected, on the one hand, to the lifting cutter 10 and, on the other hand, to the forward portion 46 of the hood 45. The portion 46 extends from behind the lifting cutter 10 to above the tamping roller 23 and is guided, on the one hand, by resting on a transverse rod 48 of the frame 1 and, on the other hand, by resting on a fixed portion 49 of the hood 45. Inasmuch as the speed of rotation of the lifting cutter 10 is rather high, the forward portion 46 of the hood 45 will oscillate at a correspondingly high frequency, which, on the one hand, avoids the possibility of undesired ahderence of soil to the hood 45 and, on the other hand, enhances the movement of the soil toward the rear of the machine.

The hood 45 again extends over and covers the tamping roller 23 in the same manner as discussed above in connection with FIG. 1. The fixed end 49 of the hood 45 which extends rearwardly beyond the tamping roller 23 is formed with notches or slots which accommodate the tubes 25. In this manner, the seeds 26 may be delivered through the tubes 25 onto the surface of the tamped layer of the thickness C previously tamped by the tamping roller 23. Herein, the discharge end of each tube 25 is located as close as possible to the point of descent of the soil previously lifted by the lifting cutter 10 onto the tamped ground, so that the type of seed distribution obtained as a result of the operation of the machine shown in FIG. 2 resembles that obtained in sowing in a row. This is attributable to the fact that the seeds 26 do not have sufficient time available to them to distribute themselves on the tamped surface, inasmuch as they are immediately covered by a layer of soil having a thickness D which is as uniform as possible, without becoming mixed with this soil layer.

This covering soil layer may advantageously be slightly compacted due to the action thereon by a rounded lower portion 50 of the hood 44, which, in a sense, performs the same function as the roller 27 illustrated in FIG. 1. The positions of the free ends of the tubes 25 are adjustable from close to the tamping roller 23 to close to the zone at which the previously lifted soil reaches the tamped ground.

Even though several modifications of the invention have been described above in connection with FIGS. 1 and 2, it is quite clear that the various elements or components of these modifications could be combined with one another in a manner different from that discussed above. So, for instance, the hood 37 which extends from rearwardly of the lifting cutter 10 to above the roller 23, as shown in FIG. 1, could be employed in the machine of FIG. 2 after omitting the mechanism which causes the forward portion 46 of the hood 35 to vibrate. Similarly, the machine of FIG. 2 could be equipped with the compacting roller 27 shown in FIG. 1. In addition thereto, it is equally possible to situate the discharge ends of the tubes 25 which convey the seeds 26 onto the tamped surface in the immediate vicinity of the zone at which the soil dislodged by the lifting cutter 10 returns to the ground. In this manner, planting in rows can be obtained even in the machine of FIG. 1. Similarly, the machine of FIG. 2 could be modified to achieve planting at random by transferring the discharge ends of tubes 25 closer to the tamping roller 23.

Finally, it is to be mentioned that a machine according to the invention may also be used for planting seeds 26 without being equipped with the breaking-up tools 29 or 41 which has been discussed above. In that case, the ground must be prepared for planting which means that at least the uppermost layer of the soil must have been crushed or broken up prior to the use of such a machine.

Having thus described the invention, what I claim as new and desire to be secured by a Letters Patent, is as follows:

1. A machine movable in a forward direction over a ground, and operable for planting seeds into the ground, comprising in combination break-up means positioned forwardly for breaking up the ground, soil conveyance means including a soil lifting device disposed rearwardly of said break-up means operative for moving and lifting a top layer of soil off the thus broken ground, so that a lower layer of the ground is uncovered, said soil lifting device comprises a plurality of tools, rotatable about an axis transverse to said forward direction, tamping means located rearwardly of said soil lifting device and including a tamping roller rotatable about an axis transverse to said forward direction, said tamping roller being adapted for providing a tamping of the uncovered lower layer free of any of the top layer immediately previously removed from the soil by said soil conveyance means, seed emplacement means for placing seeds on the tamped lower layer;

said soil conveyance means conveying the lifted soil upwardly and so as to deposit it on the ground to the rear of said seed emplacement means, and compacting means rearwardly of said tamping means, for compacting the deposited covering layer, whereby the lifted soil is deposited in the form of a loose-consistency covering layer onto the tamped layer, and onto the seed placed on the tamped surface.

2. The machine as claimed in claim 1, wherein said soil conveyance means further comprises a guide channel extending from said soil lifting device upwardly and rearwardly beyond said tamping means, whereby the lifted soil is substantially restrained in being deposited forwardly of said tamping means.

3. The machine as claimed in claim 2, wherein said tools of said soil lifting device include blades rotating about said axis transverse to said direction, and in such a sense as to propel the lifted soil through said guide channel.

4. The machine as claimed in claim 1, further comprising calibrating means for controlling the lifted quantity of soil advancing from said soil lifting device rearwardly, and regulating means for adjusting said calibrating means for a desired quantity of soil.

5. The machine as claimed in claim 1, wherein said break-up means is operative for breaking up the soil to a depth exceeding the depth of operation of said soil lifting device.

6. The machine as claimed in claim 1, further comprising preventive means for restraining coarse bodies located at the ground from being lifted by said soil conveyance means.

7. The machine as claimed in claim 6, wherein said soil conveyance means are located rearwardly of said break-up means, and wherein said preventive means includes a grating interposed between said break-up means and said soil conveyance means.

8. The machine as claimed in claim 1, further including a frame wherein said tamping roller is fastened to the frame so as to support at least a part of the weight of said machine.

* * * * *